(12) United States Patent
Barak et al.

(10) Patent No.: US 8,907,927 B2
(45) Date of Patent: Dec. 9, 2014

(54) CAMERA BASED HOVER DETECTION FOR TOUCH-BASED MOBILE DEVICES

(75) Inventors: Nimrod Barak, Tel Aviv (IL); Nissim Pariente, Kiryat-Ono (IL)

(73) Assignee: SAP Portals Israel Ltd, Ra'anana (IL)

( * ) Notice: Subject to any disclaimer, the term of this patent is extended or adjusted under 35 U.S.C. 154(b) by 127 days.

(21) Appl. No.: 13/614,196

(22) Filed: Sep. 13, 2012

(65) Prior Publication Data

US 2014/0071091 A1    Mar. 13, 2014

(51) Int. Cl.
G06F 3/042    (2006.01)
G06F 3/041    (2006.01)

(52) U.S. Cl.
USPC ............................. 345/175; 345/173; 709/206

(58) Field of Classification Search
CPC ................................ G06F 3/011; G07F 17/32
USPC .................... 345/173, 175; 709/206
See application file for complete search history.

(56) References Cited

U.S. PATENT DOCUMENTS 7,984,417 B2    7/2011 Ben-Zvi et al.
2007/0143415 A1*   6/2007 Daigle ...................... 709/206

OTHER PUBLICATIONS

U.S. Appl. No. 13/301,971, filed Nov. 22, 2011 entitled "Focusing on Contextually-Relevant Content".
U.S. Appl. No. 13/596,906, filed Aug. 28, 2012 entitled "Integrating Native Application into Web Portal".
U.S. Appl. No. 13/595,268, filed Aug. 27, 2012, entitled "Business Notification Engine".

* cited by examiner

*Primary Examiner* — Kevin M Nguyen
(74) *Attorney, Agent, or Firm* — Fish & Richardson P.C.

(57) ABSTRACT

The disclosure generally describes computer-implemented methods, software, and systems for providing camera-based hover detection for touch-based mobile devices. One computer-implemented method includes receiving image data from at least one image capture device associated with a particular client device, comparing, by operation of a computer, the received image data to existing image data, wherein the existing image data partially includes extrapolated imaged data, determining that the received image data does not compare with existing image data and transmitting the received image data to a server for post-processing, processing, by operation of a computer, post-processed image data received from the server, wherein the processing includes updating a user configuration with the post-processed image data, and generating a hover event based upon the received image data.

21 Claims, 7 Drawing Sheets

FIG. 6

CAMERA BASED HOVER DETECTION FOR TOUCH-BASED MOBILE DEVICES

BACKGROUND

In modern mobile devices, interactions are often performed through touch actions performed using a touch interface. The touch actions are normally accomplished with a digit, for example a finger, a stylus, or some other suitable pointing device. While the touch interface provides additional functionality not available on computing environments using a pointer-style interface and a device to move the pointer, such as a computer mouse or other suitable device, some standard functionality is also lost in the touch environment. For example, in a pointer-style interface, a user can "hover" over a location and/or user interface (UI) element on a computer display. The user's hover action can then be used to trigger a specific hover event, such as the display of a tooltip UI element to provide more information associated with the location and/or UI element or to signal intent of the user to select the UI element. However, the ability to detect hover-type actions and to generate standoff-events are generally not provided on touch interfaces. The inability to perform hover actions on a mobile device touch interface limits both the usability of the mobile device and the touch interface.

SUMMARY

The present disclosure relates to computer-implemented methods, software, and systems for providing camera-based hover detection for touch-based mobile devices. One computer-implemented method includes receiving image data from at least one image capture device associated with a particular client device, comparing, by operation of a computer, the received image data to existing image data, wherein the existing image data partially includes extrapolated imaged data, determining that the received image data does not compare with existing image data and transmitting the received image data to a server for post-processing, processing, by operation of a computer, post-processed image data received from the server, wherein the processing includes updating a user configuration with the post-processed image data, and generating a hover event based upon the received image data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features:

A first aspect, combinable with the general implementation, further comprising post-processing the received image data on the server.

In a second aspect, combinable with any of the previous aspects, wherein the post-processing further comprises extrapolating additional display coordinate points and display-standoff values for the received image data.

A third aspect, combinable with any of the previous aspects, further comprising updating a user configuration associated with the server with the post-processed image data.

In a fourth aspect, combinable with any of the previous aspects, wherein the user configuration updating further comprises associating the updates to the user configuration with the particular client device.

A fifth aspect, combinable with any of the previous aspects, further comprising updating a user configuration associated with the client device with the post-processed image data.

A sixth aspect, combinable with any of the previous aspects, further comprising performing an action on a graphical user interface based upon the generated hover event.

The subject matter described in this specification can be implemented in particular implementations so as to realize one or more of the following advantages. First, the ability to detect hover actions allows mobile device/application developers to provide additional functionality for mobile devices/applications through an enhanced user interface (UI). The additional functionally may include better orientation awareness and interaction with a particular enhanced UI and an associated application, for example an enterprise portal. Second, accessibility may be enhanced for users with visual or other disabilities. Third, the ability to detect hover actions allows mobile devices/applications to display contextual information to a user associated with elements on the enhanced UI. Fourth, enhanced UI functionality may provide a marketing advantage for a particular mobile device/application. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The disclosure generally describes computer-implemented methods, software, and systems for providing camera-based hover detection for touch-based mobile devices. For the purposes of this disclosure, an enterprise resource portal (ERP), also known as an enterprise information portal (EIP) or a corporate portal, is a framework for integrating information, people, and processes across organizational boundaries. An ERP provides a secure unified access point, often in the form of a web-based user interface, and is designed to aggregate and personalize information through application-specific portals. The ERP is a de-centralized content contribution and content management system, which keeps the information always updated. With only a web browser, enterprise portal users can begin work once they have been authenticated in the ERP which offers a single point of access to information, enterprise applications, and services both inside and outside an organization. ERPs may present information from diverse sources on mobile or other devices in a unified and structured way, and provide additional services, such as dashboards, an internal search engine, e-mail, news, navigation tools, and various other features. ERPs are often used by enterprises for providing their employees, customers, and possibly additional users with a consistent look and feel, and access control and procedures for multiple applications, which otherwise would have been separate entities altogether.

Figure 1:
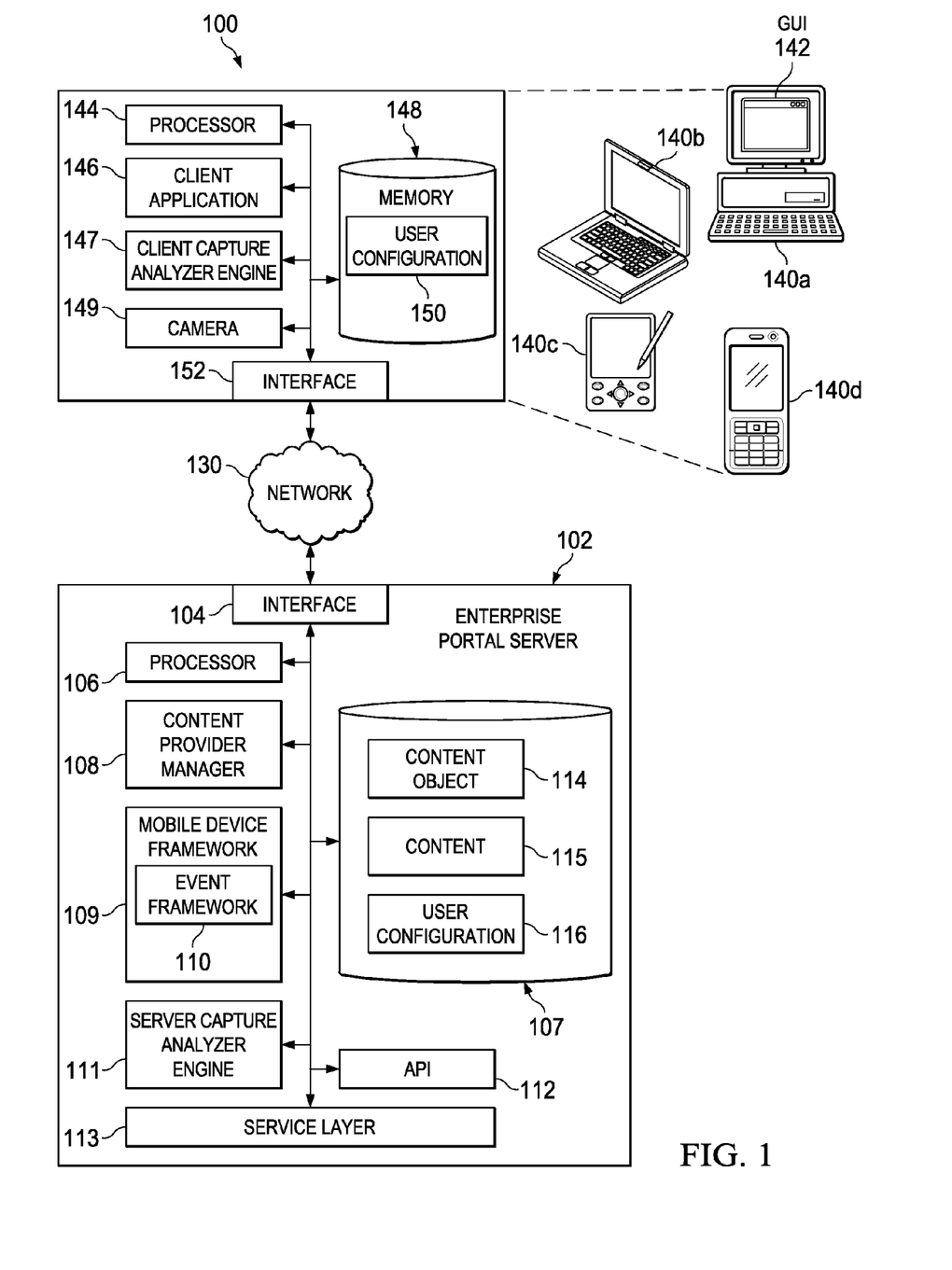
FIG. 1 is a block diagram illustrating an example distributed computing system for providing camera-based hover detection for touch-based mobile devices.

FIG. 1 is a block diagram illustrating an example distributed computing system 100 for providing camera-based hover detection for touch-based mobile devices. The illustrated example distributed computing system 100 includes or is communicably coupled with an enterprise portal server (EPS) 102 and a client 140 that communicate across a network 130.

At a high level, the EPS server 102 is an electronic computing device operable to receive, transmit, process, store, or manage data and information associated with the example distributed computing system 100. Generally, the EPS server 102 allows users to view, compose, modify, delete, and deploy enterprise portal pages. Specifically, the described computer-implemented methods, software, and systems provide functionality for providing camera-based hover detection for touch-based mobile devices through one or more mobile-device cameras and a graphical user interface (GUI) providing a user with an efficient and user-friendly presentation of data provided by or communicated within the example distributed computing system 100.

The EPS 102 is responsible for receiving application requests, for example enterprise portal navigation requests, from one or more client applications associated with the client 140 of the example distributed computing system 100 and responding to the received requests by processing said requests in the associated content provider manager 108, and sending the appropriate response from the content provider manager 108 back to the requesting client application 146. In addition to requests from the client 140, requests associated with the content provider managers may also be sent from internal users, external or third-party customers, other automated applications, as well as any other appropriate entities, individuals, systems, or computers. According to one implementation, EPS 102 may also include or be communicably coupled with an e-mail server, a web server, a caching server, a streaming data server, and/or other suitable server.

The EPS 102 contains a content provider manager 108, a mobile device framework 109, an event framework 110, and a server capture analyzer engine 111 where at least a portion of the content provider manager 108, the mobile device framework 109, the event framework 110, and the server capture analyzer engine 111 is executed using requests/responses sent from/to a client 140 within and communicably coupled to the illustrated example distributed computing system 100 using network 130. In some implementations, requests/responses can be sent directly to EPS 102 from a user accessing EPS 102 directly. In some implementations, the EPS 102 may store a plurality of various content provider managers 108, mobile device frameworks 109, event frameworks 110, and server capture analyzer engines 111. In some implementations, the EPS 102 may comprise a web server, where one or more of the components of EPS 102 represent web-based applications accessed and executed by the client 140 using the network 130 or directly at the EPS 102 to perform the programmed tasks or operations of the various components of EPS 102.

In some implementations, any and/or all of components of the EPS 102, both hardware and/or software, may interface with each other and/or the interface using an application programming interface (API) 112 and/or a service layer 113. The API 112 may include specifications for routines, data structures, and object classes. The API 112 may be either computer language independent or dependent and refer to a complete interface, a single function, or even a set of APIs. The service layer 113 provides software services to the example distributed computing system 100. The functionality of the EPS 102 may be accessible for all service consumers using this service layer. Software services, such as provide reusable, defined business functionalities through a defined interface. For example, the interface may be software written in JAVA, C++, or other suitable language providing data in extensible markup language (XML) format or other suitable format.

While illustrated as an integrated component of the EPS 102 in the example distributed computing system 100, alternative implementations may illustrate the service layer 113 as a stand-alone component in relation to other components of the example distributed computing system 100. Moreover, any or all parts of the service layer 113 may be implemented as child or sub-modules of another software module, enterprise application, or hardware module without departing from the scope of this disclosure.

The EPS 102 includes an interface 104. Although illustrated as a single interface 104 in FIG. 1, two or more interfaces 104 may be used according to particular needs, desires, or particular implementations of the example distributed computing system 100. The interface 104 is used by the EPS 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The EPS 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the EPS 102. Specifically, the processor 106 executes the functionality required to provide camera-based hover detection for touch-based mobile devices.

The EPS 102 also includes a memory 107 that holds data for the enterprise server 102. Although illustrated as a single memory 107 in FIG. 1, two or more memories may be used according to particular needs, desires, or particular implementations of the example distributed computing system 100.

While memory 107 is illustrated as an integral component of the EPS 102, in alternative implementations, memory 107 can be external to the EPS 102 and/or the example distributed computing system 100. In some implementations, the memory 107, i.e., the content repository for the ERP that holds the description and/or data for all objects in the ERP 102, includes one or more instances of a content object 114, content 115, and a user configuration 116.

The content object 114 can be considered a representation of a business/non-business entity, such as an employee, a sales order, an invoice, a financial report, etc. The content object 114 may encompass both functions, for example in the form of methods, and data, such as one or more properties. For example, content objects 114 may reduce system complexity by reducing a system into smaller units. The implementation details of content objects 114 are typically hidden from a non-development user and may be accessed through the defined functions and encapsulated data. Content objects 114 also form a point of entry of the functions and data of a system and enable the system to easily share, communicate, display, or otherwise operate with other systems. A content object 114 may also be considered the target of a request for data, for example a navigation node in an ERP, a web page, or the final destination of a navigation action, etc. and may contain the view to be displayed when the content object 114 is accessed. In some implementations, the content object 114 can control the location of a selected view, personalized views for a specific enterprise portal user, and dynamic views. In some implementations, metadata (not illustrated) may be used to determine the context of a particular displayed view.

The content 115 is encountered as part of the user experience when accessing a content object 114 within an enterprise portal. The content 115 may include, among other things: text, images, sounds, videos, and animations. While illustrated as integrated with memory 107 of the EPS 102 in the example distributed computing system 100, in alternative implementations, the content 115 can be external to the EPS 102 and/or the example distributed computing system 100, for example associated with external content providers (not illustrated), or can be internal to the EPS 102, for example stored within the content object 114 itself The user configuration 116 is data associated with an EPS 102 user. The user configuration 116 data may include, for example, name, department, position, salary, hire date, a role, system password, contact information, location, locale, hover data points, and other suitable data. In some implementations, the user configuration 116 can contain extrapolated hover data points based on one or more hover data points captured in a calibration procedure. In some implementations, location is a dynamic property that could be extracted from a location-enabled device, for example a mobile telephone, computer, etc., and could change while the location-enabled device is traveling. In some implementations, locale can be used to define a default language of a consuming device. In some implementations, the system password of the consuming device cannot be used and/or saved for security reasons. In some implementations, the user configuration 116 can be used by the mobile device framework 109 (described below), event framework 110 (described below) and/or the sever capture analyzer engine 111 to provide camera-based hover detection for touch-based mobile devices. In these implementations, the user configuration 116 can also be used to provide predetermined hover data to the EPS 102 content displayed by the client application 146 (described below).

The content provider manager 108 is any type of application that allows the client 140 to request and view content on the client 140 after obtaining content from the EPS 102 and/or a content provider (not illustrated) in response to a received request from the client 140. A content provider may be, for example, applications and data on the EPS 102 and/or external services, business applications, business application servers, databases, RSS feeds, document servers, web servers, streaming servers, caching servers, or other suitable content sources. In some implementations, the content provider manager 108 enables the consumption of content provider content by client 140. In some implementations, the content provider manager 108 allows connections to various content providers, queries the content provider with regards to provided content, and enables a user to view, add, edit, and/or delete content associated with the EPS 102.

In some implementations, the content provider manager 108 can use content provider manager data (not illustrated) or other above-describe data stored in memory 107, for example user configuration data 116, to perform tasks associated with the EPS 102 or other components of the example distributed computing system 100. Content provider manager data may include any type of data associated with and/or used by the content provider manager 108, including content provider locations, addresses, storage specifications, content lists, access requirements, or other suitable data. For example, for a database content provider, the content provider manager data may include the server Internet Protocol (IP) address, Uniform Resource Locator (URL), access permission requirements, data download speed specifications, etc.

Once a particular content provider manager 108 is launched, a client 140 may interactively process a task, event, or other information associated with the EPS 102. The content provider manager 108 can be any application, program, module, process, or other software that may execute, change, delete, generate, or otherwise manage information associated with a particular client 140, and in some cases, a business process (not illustrated) performing and executing business process-related events on the EPS 102 and/or the client 140. For example, the content provider manager 108 may be a portal application, a business application, and/or other suitable application consistent with this disclosure. Additionally, a particular content provider manager 108 may operate in response to and in connection with at least one request received from other content provider managers 108, including a content provider manager 108 associated with another EPS 102. In some implementations, the content provider manager 108 can be and/or include a web browser. In some implementations, each content provider manager 108 can represent a network-based application accessed and executed using the network 130 (e.g., through the Internet, or using at least one cloud-based service associated with the content provider manager 108). For example, a portion of a particular content provider manager 108 may be a Web service associated with the content provider manager 108 that is remotely called, while another portion of the content provider manager 108 may be an interface object or agent bundled for processing at a remote client 140. Moreover, any or all of a particular content provider manager 108 may be a child or sub-module of another software module or enterprise application (not illustrated) without departing from the scope of this disclosure. Still further, portions of the particular content provider manager 108 may be executed or accessed by a user working directly at the EPS 102, as well as remotely at a corresponding client 140. In some implementations, the EPS 102 can execute the content provider manager 108.

The mobile device framework 109 is an infrastructure supporting a client 140 that includes a set of client-side services along with UI elements that represent a shell for a hosted application, for example a client application 146, on the client 140. The client-side services include services such as those that support communication with the UI elements associated with a client (e.g., passing details for contextual menus, values for pull-down menus, etc.), retrieval of environment details (e.g., localization data, languages, etc.), user details, session details, and the like. The UI elements provide basic portal orientation in the client 140, such as a portal page header with navigation buttons (e.g., menu, back, and forward), contextual menus, a search UI, a favorites menu, and the like. In some implementations, the mobile device framework 109 is responsible for communicating correct content to the client device according to device metadata and a configuration that may be defined for the client device detailing content that can be enabled and/or disabled depending on the type of client device (e.g., a tablet computer, a smart phone, a laptop computer, etc.). The mobile device framework 109 also provides a server-side framework that may perform business logic and support connectivity to the memory 107, for example where memory 107 is a database.

The event framework 110 is an infrastructure loaded to a client application 146, for example a browser, by the mobile device framework 109. Using the event framework 110, applications and one or more components of the event framework 110 may generate and/or receive events, enabling communication between client 140 components at runtime. The event framework 110 is used by the mobile device framework 109 for interaction between mobile device framework 109 components and/or applications interacting with the event framework 110. The event framework 110 may also be used by applications in their interactions with each other. Interactions with the framework may include, for example, adding a menu item to a contextual menu, triggering navigation to an ERP page and/or an application, and/or other suitable interaction. Although illustrated as integral to the mobile device framework 109, in some implementations, the event framework 110 may be external from the mobile device framework 109.

The EPS 102 further includes a server capture analyzer engine (SCAE) 111. The SCAE 111 can be any application, program, module, process, or other software that may execute, change, delete, generate, or otherwise manage information associated with a particular client 140. Specifically, the SCAE 111 is an application providing functionality for receiving captured detected image data from one or more image capture devices (e.g., cameras) associated with a client 140 during a hover action over the client 140 display. In some implementations, the SCAE 111 can also perform post-processing functions on captured detected image data. In some implementations, the extrapolated data can be used on the EPS 102 and/or the client 140 to enhance performance of the client application 146 in response to hover action detections. The SCAE 111 may be a portal application, a business application, and/or other suitable application consistent with this disclosure. Additionally, a particular SCAE 111 may operate in response to and in connection with at least one request received from other SCAEs 111, including an SCAE 111 associated with another EPS 102. In some implementations, the SCAE 111 can include a web browser. In some implementations, each SCAE 111 can represent a network-based application accessed and executed using the network 130 (e.g., through the Internet, or using at least one cloud-based service associated with the SCAE 111). For example, a portion of a particular SCAE 111 may be a Web service associated with the SCAE 111 that is remotely called, while another portion of the SCAE 111 may be an interface object or agent bundled for processing at a remote client 140. Moreover, any or all of a particular SCAE 111 may be a child or sub-module of another software module or enterprise application (not illustrated) without departing from the scope of this disclosure. Still further, portions of the particular SCAE 111 may be executed or accessed by a user working directly at the EPS 102, as well as remotely at a corresponding client 140.

The illustrated example distributed computing system 100 also includes a client 140. The client 140 may be any computing device operable to connect to or communicate with at least the EPS 102 using the network 130. In general, the client 140 comprises an electronic computer device operable to receive, transmit, process, and store any appropriate data associated with the example distributed computing system 100.

The illustrated client 140 further includes a client application 146. The client application 146 is any type of application that allows the client 140 to request, view, edit, and or delete content on the client 140 as well as to interact with the client 140 through the use of one or more cameras 149. In some implementations, the client application 146 can perform a calibration operation on the client cameras for detecting hover actions. In some implementations, the client application 146 can perform a calibration operation in partnership with the client capture analyzer engine 147 (described below). In some implementations, the client application 146 can be and/or include a web browser. In some implementations, the client-application 146 can use parameters, metadata, and other information received at launch to access a particular set of data from the EPS 102. Once a particular client application 146 is launched, a user may interactively process a task, event, or other information associated with the EPS 102. Further, although illustrated as a single client application 146, the client application 146 may be implemented as multiple client applications in the client 140. In some implementations, the client application 146 may act as a GUI interface for the content provider manager 108 and/or other components of EPS 102 and/or other components of the example distributed computing environment 100.

The client 140 further includes a client capture analyzer engine (CCAE) 147. The CCAE 147 can be any application, program, module, process, or other software that may execute, change, delete, generate, or otherwise manage information associated with a particular client 140. Specifically, the CCAE 147 is an application providing functionality for receiving captured detected image data from one or more cameras associated with a client 140 during a hover action over the client 140 display. In some implementations, the CCAE 147 can also perform post-processing functions on the captured detected image data. In some implementations, the extrapolated data can be used on the EPS 102 and/or the client 140 to enhance performance of the client application 146 in response to hover action detections. In some implementations, the CCAE 147 can perform a calibration operation on the client cameras for detecting hover actions. In some implementations, the CCAE 147 can perform a calibration operation in partnership with the client application 146. The CCAE 147 may be a client application 146 and/or other suitable application consistent with this disclosure. Additionally, a particular CCAE 147 may operate in response to and in connection with at least one request received from other CCAEs 147, including a CCAE 147 associated with another client 140. In some implementations, the CCAE 147 can include a web browser. In some implementations, each CCAE 147 can represent a network-based application accessed and executed using the network 130 (e.g., through the Internet, or using at least one cloud-based service associated with the CCAE 147). For example, a portion of a particular CCAE 147 may be a Web service associated with the CCAE 147 that is remotely called, while another portion of the CCAE 147 may be an interface object or agent bundled for processing at a remote client 140. Moreover, any or all of a particular CCAE 147 may be a child or sub-module of another software module or enterprise application (not illustrated) without departing from the scope of this disclosure. Still further, portions of the particular CCAE 147 may be executed or accessed by a user working directly at the client 140, as well as remotely at a corresponding client 140.

Camera 149 is operable to capture image information from sources external to client 140. In some implementations, camera 149 can use a lens assembly with a variable diaphragm to focus light onto an electronic image sensor and digitally record image information into memory 148 in various digital file formats. For example, digital file formats used to record the image information may be JPG, GIF, BMP, TIFF, PNG, AVI, DV, MPEG, MOV, WMV, RAW, or other suitable digital file format. In some implementations, the electronic image sensor can be a charge coupled device (CCD), an active pixel sensor (CMOS), or other suitable electronic image sensor. Camera 149 may provide a live preview of the external image source to be photographed. Camera 149 may also provide optical and/or digital zoom functionality and panoramic images in both two and three dimensions. In other implementations, the recorded image information can be both still and video with sound. Camera 149 can capture image data at and above the surface of the display of the client 140. Image information recorded by camera 149 may also be transferred over network 130 to a remote data storage location (not illustrated) instead of being stored in memory 148. Although illustrated as integral to client 140, camera 149 may also be physically or communicably connected to client 140. For example, camera 149 may be inserted into or connected to (e.g., by a cable) an interface port (not illustrated) on client 140. While the client 140 is illustrated as containing a single camera 149, alternative implementations of client 140 may include any number of cameras 149 in any orientation/configuration suitable to the purposes of the client 140.

Figure 2A:
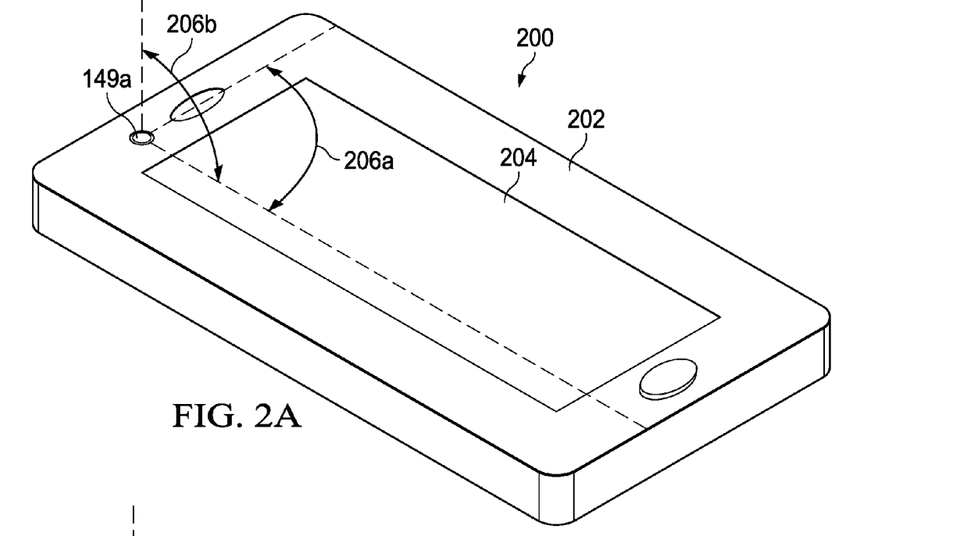
FIGS. 2A-2C illustrate example configurations of one or more cameras used to detect hover actions over mobile device displays.
Figure 2B:
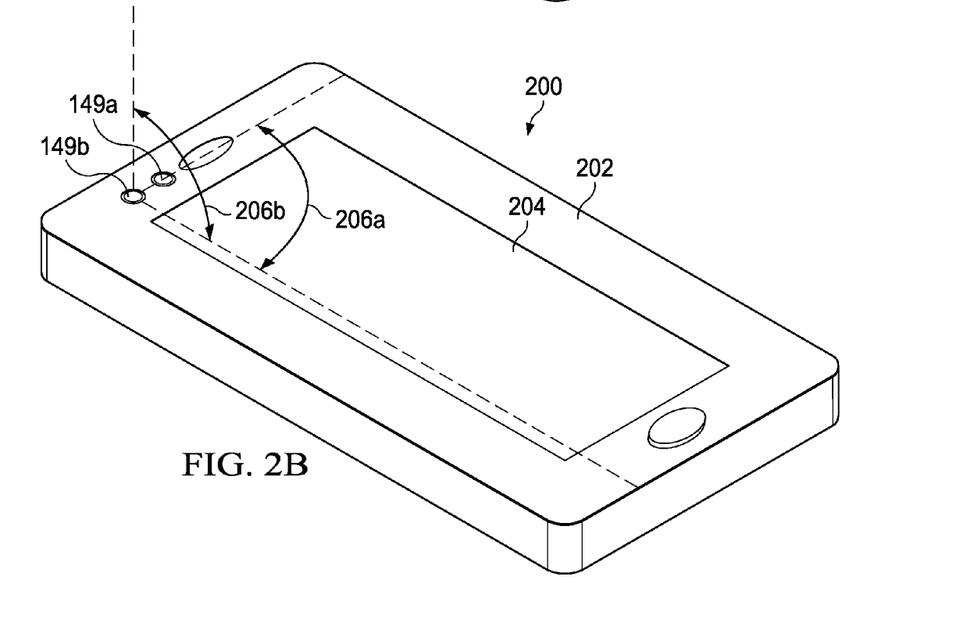
Figure 2C:
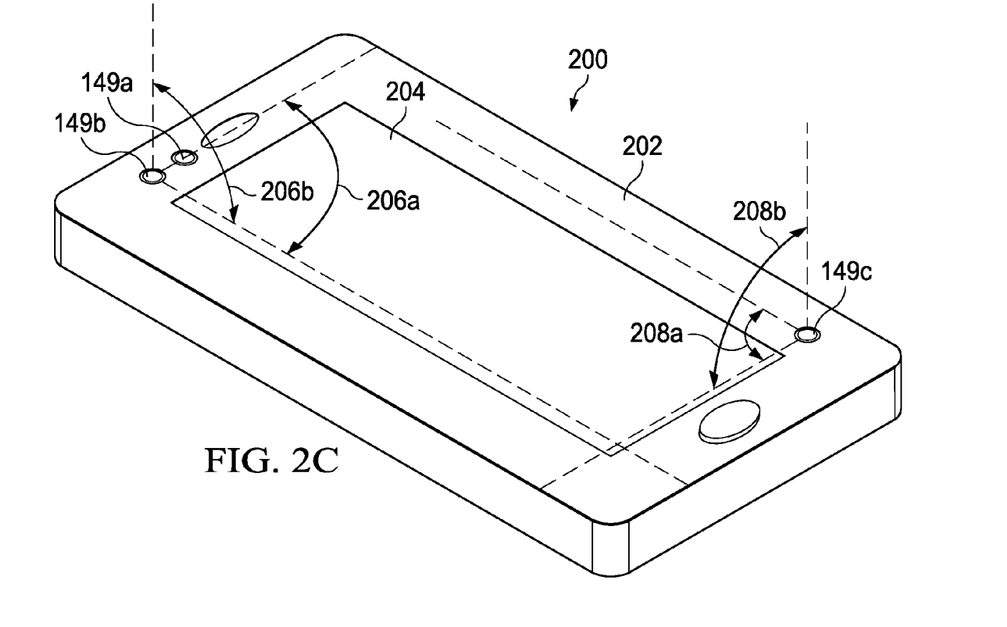

Turning now to FIGS. 2A-2C, FIGS. 2A-2C illustrate example configurations of one or more cameras 149 used to detect hover actions over mobile device displays. With reference to FIG. 2A, FIG. 2A illustrates a mobile device 202 with a single camera 149 able to detect image data at and above the surface of a display 204. The detection is capable, for example, along the angles illustrated by 206a and 206b. In this implementation, camera 149a performs image detection for the entire display 204 and well as normal camera functions for the mobile device, for example taking pictures, recording video, and other suitable functions.

As shown by FIG. 2B, mobile device 202 is illustrated with two cameras 149a and 149b. In this implementation camera 149a is not used for hover-action image detection. Camera 149b is able to detect image data at and above the surface of a display 204 along the angles illustrated by 206a and 206b. In this implementation, camera 149b performs image detection for the entire display 204.

As shown by FIG. 2C, mobile device 202 is illustrated with three cameras 149a, 149b, and 149c. In this implementation camera 149a is not used for hover-action image detection. Cameras 149b and 149c are used to detect image data at and above the surface of a display 204 along the angles illustrated by 206a/206b and 208a/208b, respectively. In this implementation, each camera 149b and 149c performs image detection for at least part of display 204. In some implementations, each of the cameras 149a and 149b can perform image detection for the entire display 204.

As will be appreciated by those of skill in the art, FIGS. 2A-2C are for illustrative purposes only. The illustrated mobile devices may have more or less cameras in orientations and configurations different from those illustrated and capable of detecting image data along different angles without departing from the scope of this disclosure.

Returning now to FIG. 1, the illustrated client 140 further includes an interface 152, a processor 144, and a memory 148. The interface 152 is used by the client 140 for communicating with other systems in a distributed environment—including within the example distributed computing system 100—connected to the network 130; for example, the EPS 102 as well as other systems communicably coupled to the network 130 (not illustrated). The interface 152 may also be consistent with the above-described interface 104 of the enterprise server 102 or other interfaces within the example distributed computing system 100. The processor 144 may be consistent with the above-described processor 106 of the EPS 102 or other processors within the example distributed computing system 100. Specifically, the processor 144 executes instructions and manipulates data to perform the operations of the client 140, including the functionality required to send requests to the EPS 102 and to receive and process responses from the EPS 102. The memory 148 may be consistent with the above-described memory 107 of the EPS 102 or other memories within the example distributed computing system 100 but storing objects and/or data associated with the purposes of the client 140. Memory 148 is also shown to contain user configuration 150. User configuration 150 may be consistent with the above-described user configuration 116 but containing data associated specifically with the purposes of the client 140. In some implementations, user configuration 150 may be kept wholly and/or partially consistent with user configuration 116 by the EPS 102 and/or the client 140.

Further, the illustrated client 140 includes a GUI 142. The GUI 142 interfaces with at least a portion of the example distributed computing system 100 for any suitable purpose, including generating a visual representation of a web browser. The GUI 142 may be used to view and navigate various web pages located both internally and externally to the EPS 102. In particular, the GUI 142 may be used to perform functions for providing camera-based hover detection for touch-based mobile devices.

There may be any number of clients 140 associated with, or external to, the example distributed computing system 100. For example, while the illustrated example distributed computing system 100 includes one client 140 communicably coupled to the EPS 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes a camera, an input device, such as a keypad, touch screen, or other device that can accept user information, and an output device that conveys information associated with the operation of the EPS 102 or the client 140 itself, including digital data, visual information, or a GUI 142, as shown with respect to the client 140.

Figure 3:
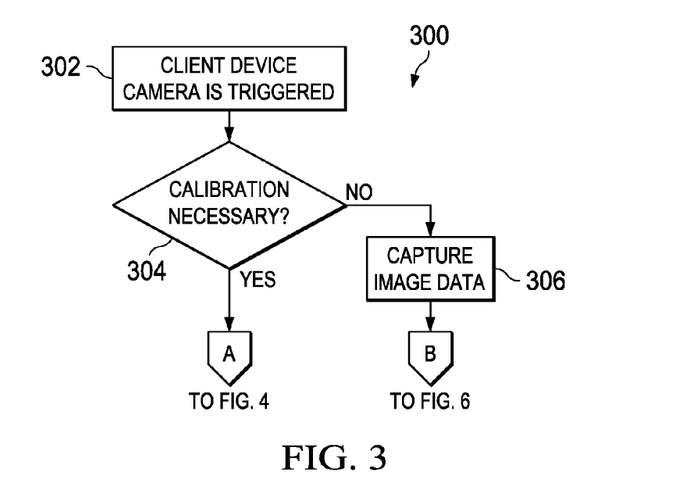
FIG. 3 is a flow chart of an example method for triggering one or more cameras on a client device following access to an enterprise portal.

Turning now to FIG. 3, FIG. 3 is a flow chart of an example method 300 for triggering one or more cameras on a client device following access to an enterprise portal. For clarity of presentation, the description that follows generally describes method 300 in the context of FIGS. 1 and 2A-2C. However, it will be understood that method 300 may be performed, for example, by any other suitable system, environment, software, and hardware, or a combination of systems, environments, software, and hardware as appropriate.

At 302, one or more client cameras are triggered. In some implementations, a portal access request is transmitted to an enterprise portal server (EPS), a response code is received by the client from the EPS, and the received response code is rendered on the client triggering the one or more client cameras. In some implementations, the received response code includes post-processed image data (see FIG. 4 and FIG. 6). In some implementations, the rendered response code detects the availability of the one or more client cameras. In some implementations, the rendered response code requests permission from a user to permit access to the one or more client cameras, for example through a UI confirmation dialog.

In other implementations, a client-side interaction can trigger the one or more client cameras. For example, starting an application or some action performed in a running application, such as selecting a menu item, can be a trigger for the one or more client cameras. From 302, method 300 proceeds to 304.

At 304, a determination is made whether a calibration process is necessary. If at 304, it is determined that a calibration process is necessary, method 300 proceeds to FIG. 4. If at 304, however, it is determined that a calibration process is not necessary, method 300 proceeds to 306.

At 306, image data is captured by the client device camera. In some implementations, the camera continuously monitors for image data. In other implementations, the camera may only monitor for image data when motion is detected within the camera's field-of-view. In still other implementations, the client device camera can monitor data continuously and/or intermittently based upon signals received from the client device and/or other device within the example distributed computing system 100. Once image data is captured, method 300 proceeds to FIG. 6.

Figure 4:
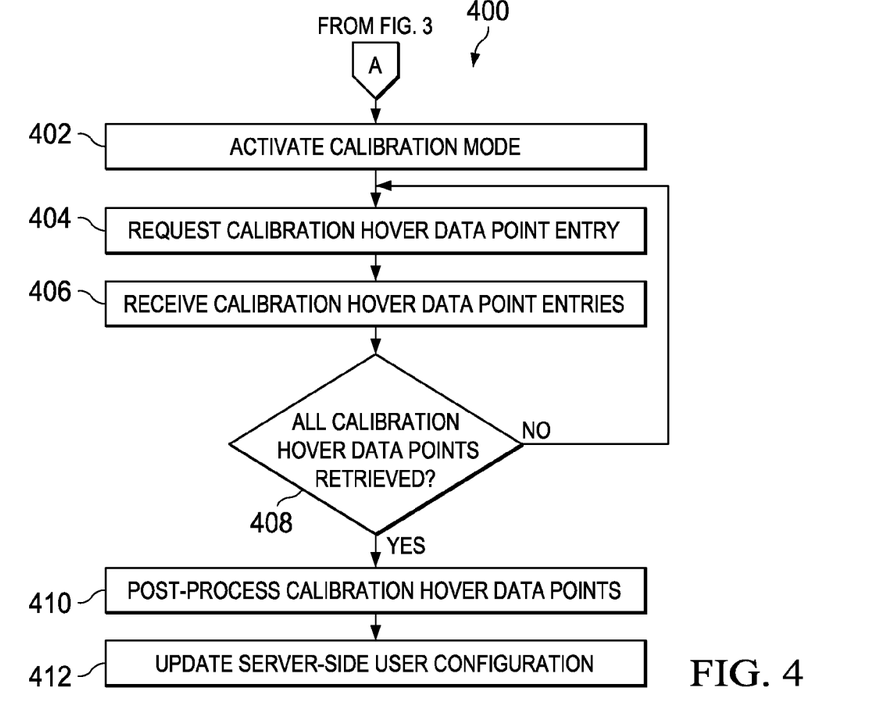
FIG. 4 is a flow chart of an example method for performing a calibration of one or more cameras for detecting hover actions on a client device.

Turning now to FIG. 4, FIG. 4 is a flow chart of an example method 400 for performing a calibration of one or more cameras for detecting hover actions on a client device. For clarity of presentation, the description that follows generally describes method 400 in the context of FIGS. 1, 2A-2C, and 3. However, it will be understood that method 400 may be performed, for example, by any other suitable system, environment, software, and hardware, or a combination of systems, environments, software, and hardware as appropriate.

Figure 5A:
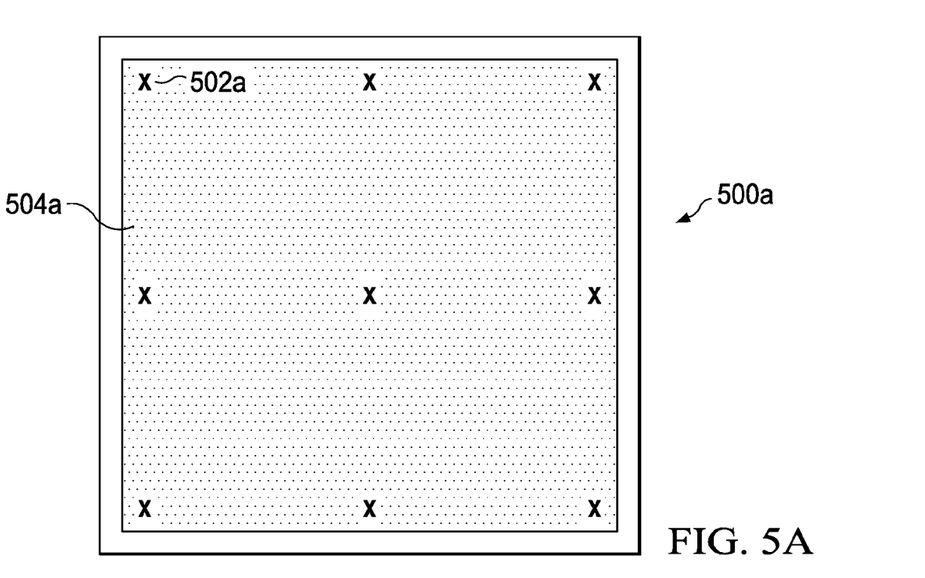
FIGS. 5A-5D illustrate example post-processed coordinate areas on a client device display following a calibration of one or more cameras for detecting hover actions on a client device.

At 402, a calibration mode is activated on the client. In some implementations, the calibration mode may be performed using defined calibration points indicated for a user to hover over in a predefined sequence. For example, FIG. 5A illustrates a predefined point 504*a* along with other unlabeled predefined calibration points. Although illustrated in certain locations, the predefined calibration points may be situated anywhere on the display. Returning to FIG. 4, from 402, method 400 proceeds to 404.

At 404, calibration hover point data is requested. In some implementations, the calibration hover data points can be requested in a specific sequence with the user asked to hover at specific coordinates and/or display standoffs (i.e., heights) over the display necessary to gather image data to detect various hover actions. Note that the user may use digits, a stylus, or a generic pointing device to calibrate the cameras. Functionally, however, the user would need to perform hover actions with the same digit, stylus, or generic pointing device for the client to recognize the hover action based on captured image data. From 404, method 400 proceeds to 406.

At 406, the calibration hover data points are received by the client. In some implementations, the received calibration hover data points are stored in memory 148 for processing by the CCAE or transferred to the EPS for processing, for example by the SCAE. From 406, method 400 proceeds to 408.

At 408, a determination is made whether all calibration hover data points have been received. If at 408, it is determined that all calibration hover data points have not been received, method 400 proceeds to 404. If at 408, however, it is determined that all calibration hover data points have been received, method 400 proceeds to 410.

At 410, the received calibration hover data points are post-processed. In some implementations, the received calibration hover data points are post-processed wholly or partially by the SCAE on the EPS. In some implementations, the post-processing is preformed wholly or partially on the CCAE. Post-processing may include, for example, compression, reformatting, re-ordering, extrapolation, and other suitable post-processing operations. Extrapolation may include determining additional hover data points by using the received calibration hover data points. In this way, the example distributed computing system 100 can allow a relatively quick calibration operation on the client and then generate many extrapolated hover data points consistent with and based upon the received calibration hover data points without additional user input. Extrapolated hover data points may include hover data points corresponding to additional coordinates on a display and/or display standoff values from the display apart from values determined from the received calibration hover data points. In some implementations, post-processing functions can be performed using commercial and/or proprietary image processing algorithms and/or other algorithms.

Figure 5B:
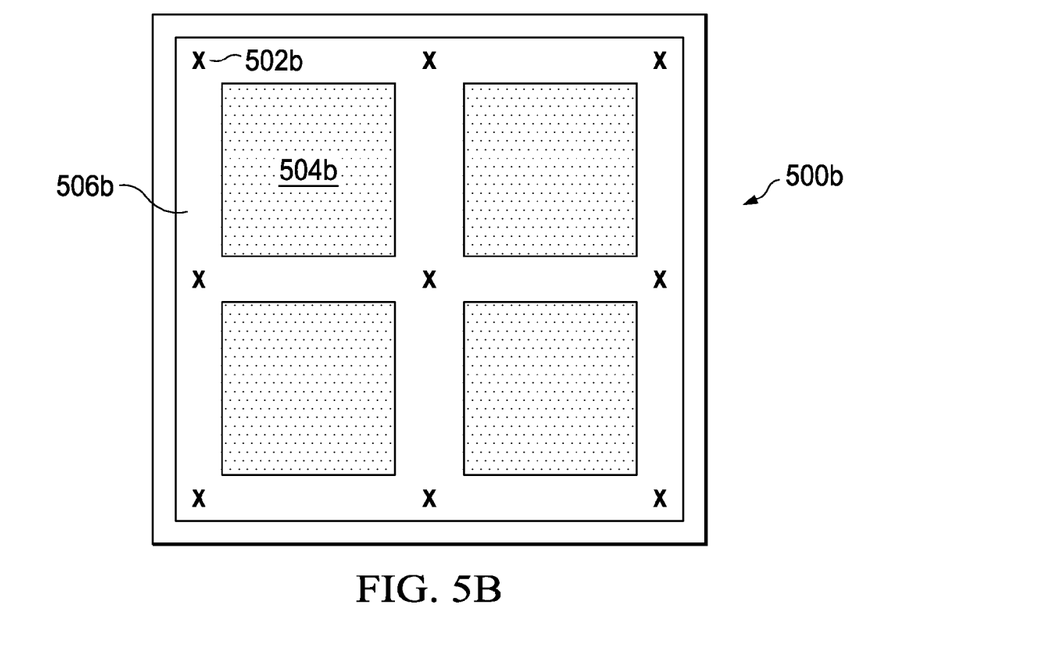
Figure 5C:
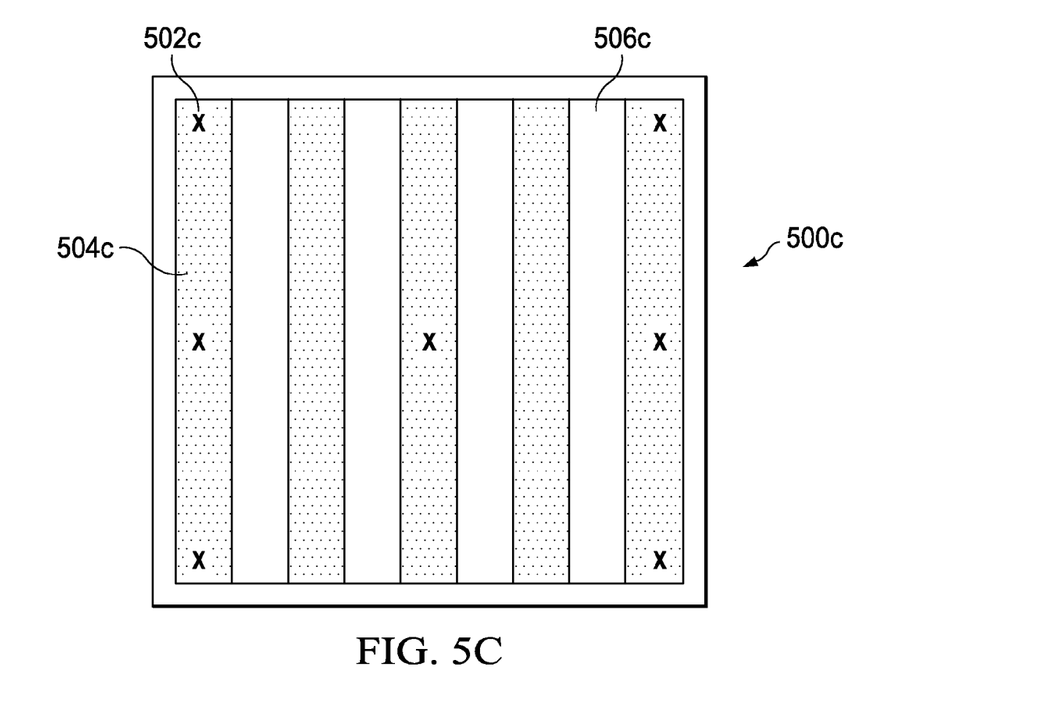
Figure 5D:
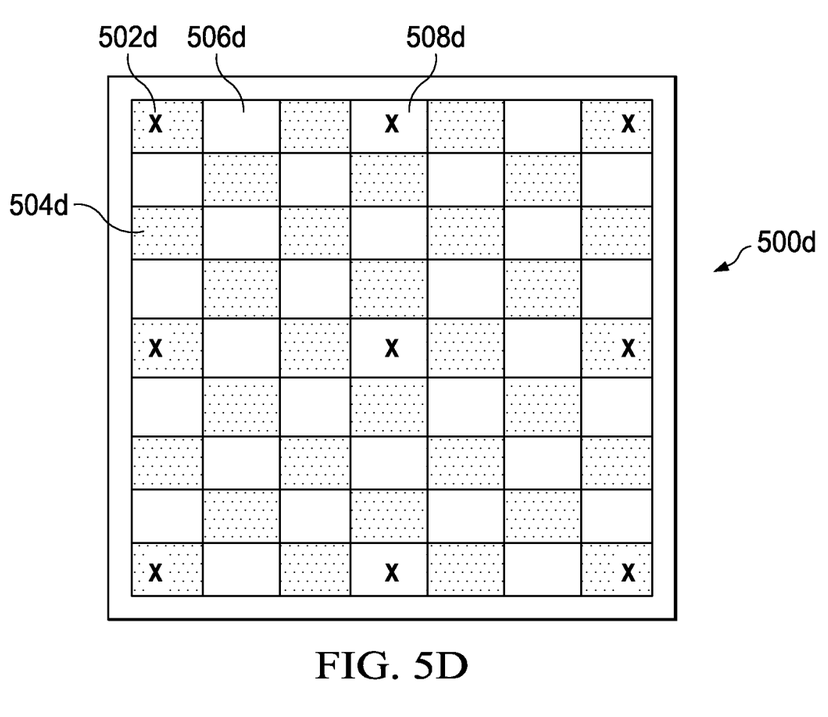

Turning now to FIGS. 5A-5D, FIGS. 5A-5D illustrate example post-processed coordinate areas 500*a*-500*d* on a client-device display following a calibration of one or more cameras for detecting hover actions on a client device. For example, FIG. 5A illustrates predefined calibration points, including calibration point 502*a*, and post-processed coordinate points, illustrated by a hashed pattern, and associated display-standoff data (not illustrated) for the entire display area 504*a*. In some implementations, the post-processed region(s) may include UI elements most likely to be selected by a user or used for hover actions. FIG. 5B also illustrates predefined calibration points, including calibration point 502*b*, and post-processed coordinate points and associated display-standoff data (not illustrated) for a partial display coordinate area 504*b*. In this instance, four regions have been post processed, including 504*b*, and are represented by blocks on the display. Display area 506*b* and other similar areas have not been post-processed. FIG. 5C also illustrates predefined calibration points, including calibration point 502*c*, and post-processed coordinate points and associated display-standoff data (not illustrated) for a partial display coordinate area 504*c*. In this instance, five regions have been post processed, including 504*c*, and are represented by vertical bands on the display. Display area 506c and other similar areas have not been post-processed. FIG. 5D also illustrates predefined calibration points, including calibration point 502d, and post-processed coordinate points and associated display-standoff data (not illustrated) for a partial display coordinate area 504d. In this instance, multiple regions have been post processed, including 504d, and are represented by a checkerboard-type pattern on the display. Display area 506d and other similar areas have not been post-processed. Note that in this instance, some of the predefined calibration points are associated with display areas that are not post-processed, for example predefined calibration point 508d. Returning to FIG. 4, from 410, method 400 proceeds to 412.

At 412, the EPS user configuration data is updated with the post-processed received hover data points. In some implementations, the user configuration contains post-processed hover data point values specific to a particular client device as well as a particular user. In this implementation, a user may have multiple device profiles associated with their user configuration data. In some implementations, the post-processed hover data point values for a particular client device can be incorporated into response code transmitted to the particular client device. In some instances, this incorporated hover point data values can be used by the client application and/or CCAE to detect hover actions on the client associated with the rendered response code on the client. From 412, method 400 stops.

Figure 6:
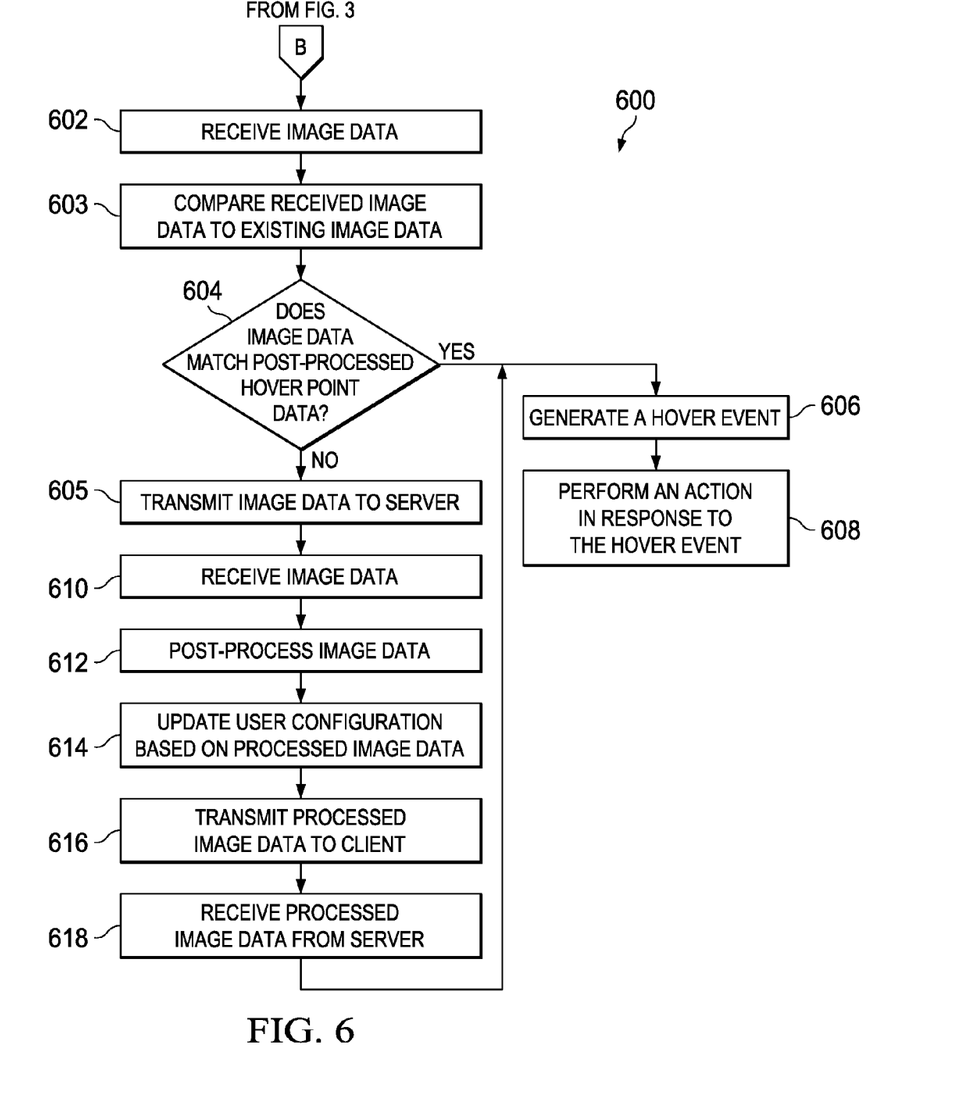
FIG. 6 is a flow chart of an example method for detecting a hover action on a client device and generating a hover event.

Turning now to FIG. 6, FIG. 6 is a flow chart of an example method 600 for detecting a hover action on a client device and generating a hover event. For clarity of presentation, the description that follows generally describes method 600 in the context of FIGS. 1, 2A-2C, 3, 4, and 5A-5D. However, it will be understood that method 600 may be performed, for example, by any other suitable system, environment, software, and hardware, or a combination of systems, environments, software, and hardware as appropriate.

At 602, image data is received by the client device through one or more cameras. From 602, method 600 proceeds to 603.

At 603, the received image data is compared to existing image data. In some implementations, the existing image data includes extrapolated image data. In some instances, the extrapolated image data was generated from received calibration hover data points as part of a calibration process. In other instances, the extrapolated data was generated as part of a hover action detection process apart from a calibration process. In some implementations, the comparison can be performed using commercial and/or proprietary image processing algorithms and/or other algorithms. From 603, method 600 proceeds to 604.

At 604, a determination is made whether the received image data matches at least one post-processed hover point data point. If at 604, it is determined that the received image data matches at least one post-processed hover point data point, method 600 proceeds to 606.

At 606, a hover event is generated corresponding to the detected hover action image data. In some implementations, coordinate and/or display-standoff values are calculated for the matched image data. In these implementations, the hover event is associated with the calculated coordinate and/or display-standoff values. From 606, method 600 proceeds to 608.

At 608, an action is performed on the UI in response to the generated hover event. In some implementations, a performed action can include displaying a tooltip for a UI element, indicating a user selection, or other suitable action. From 608, method 600 stops.

If at 604, however, it is determined that the received image data does not match at least one post-processed hover point data point, method 600 proceeds to 605. An example of this situation would be hover image data captured within display area 506b of FIG. 5B.

At 605, the received image data is transmitted to the EPS. From 605, method 600 proceeds to 610.

At 610, the transmitted image data is received by the EPS. From 610, method 600 proceeds to 612.

At 612, the received image data is post-processed by the EPS. In this instance, the image data is post-processed using commercial and/or proprietary image processing algorithms to determine display coordinate and/or display-standoff values. In some implementations, the post-processing is performed by the SCAE and/or a combination of the SCAE and some other component of the example distributed computing system 100. In some implementations, post-processing generates extrapolated display coordinates and/or display standoff values that overlap existing post-processed data.

In some implementations, image data is only processed if it appears to be a hover-type action. In some implementations, this determination may be made as part of 604 or a separate method step following 604 prior to transmitting image data to the EPS. From 612, method 600 proceeds to 614.

At 614, the processed/post-processed image data is used to update the user configuration data and/or associated device profiles. In some implementations, the user configuration may be associated with a plurality of device profiles. From 614, method 600 proceeds to 616.

At 616, the processed/post-processed image data is transmitted to the client device. From 616, method 600 proceeds to 618.

At 618, processed image date is received from the server and processed by the client. In some implementations, the processed image data is used to update the user configuration data and/or associated device profiles on the client. From 618, method 600 proceeds to 606 where processing proceeds as described above.

In some implementations, if it is determined at 604 that the received image data does not match at least one post-processed hover point data point, processing consistent with 610-616 is performed by the CCAE and/or a combination of the CCAE and some other component of the example distributed computing system 100.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   receiving image data from at least one image capture device associated with a particular client device;
   comparing, by operation of a computer, the received image data to existing image data, wherein the existing image data partially includes extrapolated image data;
   determining that the received image data does not compare with existing image data and
   transmitting the received image data to a server for post-processing;
   processing, by operation of a computer, post-processed image data received from the server, wherein the processing includes updating a user configuration with the post-processed image data; and
   generating a hover event based upon the received image data.

2. The computer-implemented method of claim 1, further comprising post-processing the received image data on the server.

3. The computer-implemented method of claim 2, wherein the post-processing further comprises extrapolating additional display coordinate points and display-standoff values for the received image data.

4. The computer-implemented method of claim 2, further comprising updating a user configuration associated with the server with the post-processed image data.

5. The computer-implemented method of claim 4, wherein the user configuration updating further comprises associating the updates to the user configuration with the particular client device.

6. The computer-implemented method of claim 1, further comprising updating a user configuration associated with the client device with the post-processed image data.

7. The computer-implemented method of claim 1, further comprising performing an action on a graphical user interface based upon the generated hover event.

8. A non-transitory, computer-readable medium storing computer instructions executable by a data processing apparatus to perform operations comprising:
   receiving image data from at least one image capture device associated with a particular client device;
   comparing the received image data to existing image data, wherein the existing image data partially includes extrapolated image data;
   determining that the received image data does not compare with existing image data and
   transmitting the received image data to a server for post-processing;
   processing post-processed image data received from the server, wherein the processing includes updating a user configuration with the post-processed image data; and
   generating a hover event based upon the received image data.

9. The computer-readable medium of claim 8, further comprising instructions to perform post-processing the received image data on the server.

10. The computer-readable medium of claim 9, wherein the post-processing further comprises extrapolating additional display coordinate points and display-standoff values for the received image data.

11. The computer-readable medium of claim 9, further comprising instructions to perform updating a user configuration associated with the server with the post-processed image data.

12. The computer-readable medium of claim 11, wherein the user configuration updating further comprises associating the updates to the user configuration with the particular client device.

13. The computer-readable medium of claim 8, further comprising instructions to perform updating a user configuration associated with the client device with the post-processed image data.

14. The computer-readable medium of claim 8, further comprising instructions to perform performing an action on a graphical user interface based upon the generated hover event.

15. A system, comprising:
   memory operable to store image data; and
   at least one hardware processor interoperably coupled to the memory and operable to:
   receive the image data from at least one image capture device associated with a particular client device;
   compare the received image data to existing image data, wherein the existing image data partially includes extrapolated image data;
   determine that the received image data does not compare with existing image data and transmitting the received image data to a server for post-processing;
   process post-processed image data received from the server, wherein the processing includes updating a user configuration with the post-processed image data; and
   generate a hover event based upon the received image data.

16. The system of claim 15, further operable to post-process the received image data on the server.

17. The system of claim 16, wherein the post-processing is further operable to extrapolate additional display coordinate points and display-standoff values for the received image data.

18. The system of claim 16, further operable to update a user configuration associated with the server with the post-processed image data.

19. The system of claim 18, wherein the user configuration update is further operable to associate the updates to the user configuration with the particular client device.

20. The system of claim 15, further operable to update a user configuration associated with the client device with the post-processed image data.

21. The system of claim 15, further operable to perform an action on a graphical user interface based upon the generated hover event.

* * * * *